(12) United States Patent
Cronin, III et al.

(10) Patent No.: US 6,510,459 B2
(45) Date of Patent: *Jan. 21, 2003

(54) NETWORK IMAGE VIEW SERVER USING EFFICIENT CLIENT-SERVER, TILING AND CACHING ARCHITECTURE

(75) Inventors: John C Cronin, III, Philadelphia, PA (US); Cecil V. Hornbaker, III, Apopka, FL (US)

(73) Assignee: Digital Paper Corporation, Alexandria, VA (US)

( * ) Notice: Subject to any disclaimer, the term of this patent is extended or adjusted under 35 U.S.C. 154(b) by 38 days.

This patent is subject to a terminal disclaimer.

(21) Appl. No.: 09/770,392

(22) Filed: Jan. 29, 2001

(65) Prior Publication Data

US 2001/0032238 A1 Oct. 18, 2001

Related U.S. Application Data

(63) Continuation of application No. 09/022,665, filed on Feb. 12, 1998, now Pat. No. 6,182,127.
(60) Provisional application No. 60/037,702, filed on Feb. 12, 1997.

(51) Int. Cl.$^7$ .............................................. G06F 15/16
(52) U.S. Cl. ...................... 709/219; 709/200; 709/203; 707/10; 707/2; 707/102
(58) Field of Search ................................ 709/203, 219, 709/200; 707/10, 2, 102

(56) References Cited

U.S. PATENT DOCUMENTS

| | | | | |
|---|---|---|---|---|
| 5,682,441 A | | 10/1997 | Lightenberg et al. | ....... 382/232 |
| 5,832,494 A | | 11/1998 | Egger et al. | ................ 707/102 |
| 5,903,892 A | | 5/1999 | Hoffert et al. | ................ 707/10 |
| 5,913,033 A | * | 6/1999 | Grout | ......................... 709/219 |
| 6,052,732 A | * | 4/2000 | Gosling | ...................... 709/203 |
| 6,137,914 A | * | 10/2000 | Ligtenberg et al. | ......... 382/240 |
| 6,182,127 B1 | * | 1/2001 | Cronin et al. | ................. 707/10 |
| 6,192,393 B1 | * | 2/2001 | Tarantino et al. | .......... 345/419 |
| 6,269,394 B1 | * | 7/2001 | Kenner et al. | ............. 709/217 |
| 6,356,283 B1 | * | 3/2002 | Guedalia | .................... 345/760 |
| 6,363,418 B1 | * | 3/2002 | Conboy et al. | .............. 707/10 |
| 6,396,941 B1 | * | 5/2002 | Bacus et al. | ................ 382/128 |

* cited by examiner

Primary Examiner—Ayaz Sheikh
Assistant Examiner—Syed Zia
(74) Attorney, Agent, or Firm—Lowe Hauptman Gilman & Berner, LLP

(57) ABSTRACT

A computer network server using HTTP (Web) server software combined with foreground view composer software, background view composer software, a view tile cache, view tile cache garbage collector software, and image files provides image view data to client workstations using graphical Web browsers to display the view of an image from the server. Problems with specialized client workstation image view software are eliminated by using the Internet and industry standards-based graphical Web browsers for the client software. Network and system performance problems that previously existed when accessing large image files from a network file server are eliminated by tiling the image view so that computation and transmission of the view data can be done in an incremental fashion. The view tiles are cached on the client workstation to further reduce network traffic. View tiles are cached on the server to reduce the amount of view tile computation and to increase responsiveness of the image view server.

37 Claims, 11 Drawing Sheets

Figure 3A

| A1 | B1 | C1 | D1 | E1 | F1 |
|----|----|----|----|----|----|
| A2 | B2 | C2 | D2 | E2 | F2 |
| A3 | B3 | C3 | D3 | E3 | F3 |
| A4 | B4 | C4 | D4 | E4 | F4 |
| A5 | B5 | C5 | D5 | E5 | F5 |
| A6 | B6 | C6 | D6 | E6 | F6 |

Figure 3B

| A1 | B1 | C1 |
|----|----|----|
| A2 | B2 | C2 |
| A3 | B3 | C3 |

Figure 4A

| A1 | B1 | C1 | D1 | E1 | F1 |
|----|----|----|----|----|----|
| A2 | B2 | C2 | D2 | E2 | F2 |
| A3 | B3 | C3 | D3 | E3 | F3 |
| A4 | B4 | C4 | D4 | E4 | F4 |
| A5 | B5 | C5 | D5 | E5 | F5 |
| A6 | B6 | C6 | D6 | E6 | F6 |

Figure 4B
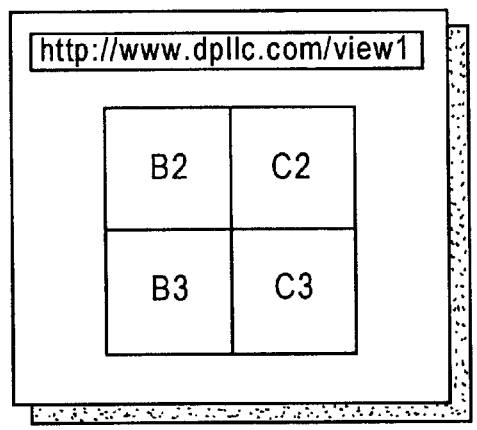
Figure 5A
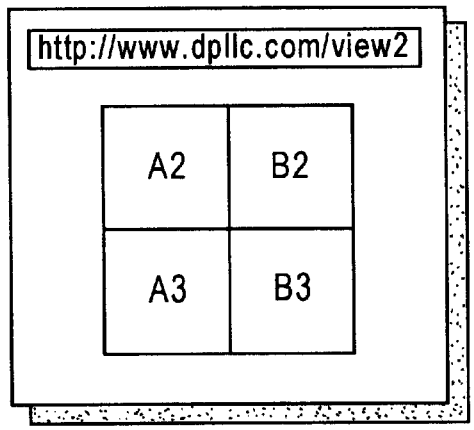
Figure 5B

| A1 | B1 | C1 | D1 | E1 | F1 | G1 | H1 | I1 | J1 | K1 |
|----|----|----|----|----|----|----|----|----|----|----|
| A2 | B2 | C2 | D2 | E2 | F2 | G2 | H2 | I2 | J2 | K2 |
| A3 | B3 | C3 | D3 | E3 | F3 | G3 | H3 | I3 | J3 | K3 |
| A4 | B4 | C4 | D4 | E4 | F4 | G4 | H4 | I4 | J4 | K4 |
| A5 | B5 | C5 | D5 | E5 | F5 | G5 | H5 | I5 | J5 | K5 |
| A6 | B6 | C6 | D6 | E6 | F6 | G6 | H6 | I6 | J6 | K6 |
| A7 | B7 | C7 | D7 | E7 | F7 | G7 | H7 | I7 | J7 | K7 |

Figure 6A

| A1 | B1 | C1 | D1 | E1 | F1 | G1 | H1 | I1 | J1 | K1 |
|----|----|----|----|----|----|----|----|----|----|----|
| A2 | B2 | C2 | D2 | E2 | F2 | G2 | H2 | I2 | J2 | K2 |
| A3 | B3 | C3 | D3 | E3 | F3 | G3 | H3 | I3 | J3 | K3 |
| A4 | B4 | C4 | D4 | E4 | F4 | G4 | H4 | I4 | J4 | K4 |
| A5 | B5 | C5 | D5 | E5 | F5 | G5 | H5 | I5 | J5 | K5 |
| A6 | B6 | C6 | D6 | E6 | F6 | G6 | H6 | I6 | J6 | K6 |
| A7 | B7 | C7 | D7 | E7 | F7 | G7 | H7 | I7 | J7 | K7 |

Figure 6B

NETWORK IMAGE VIEW SERVER USING EFFICIENT CLIENT-SERVER, TILING AND CACHING ARCHITECTURE

This application is a Continuation of application Ser. No. 09/022,665 filed Feb. 12, 1998, which claims the benefit of provisional application No. 60/037,702 filed Feb. 12, 1997 now U.S. Pat. No. 6,182,127.

BACKGROUND OF THE INVENTION

1. Field of the Invention

This invention relates to workstation viewing images of digital documents stored on a network server and in particular to viewing large digital document images using a client-server architecture.

2. Description of the Prior Art

Current methods for viewing digital document images for workstations in a networked environment use proprietary workstation application software to access a network image file server. To view an image, the application software transfers a copy of the whole image file from the image file server to the networked client workstation This method has a number limitations including: inefficient use of the network; high software purchase cost per workstation; high software administrative cost per workstation; high computational demands on the workstation; proprietary software available only for limited workstation types. Some other network image viewers may provide viewing using more optimized image transmission protocols but only with proprietary protocols and proprietary workstation software.

It is an object of the invention to provide a method of obtaining graphical images from a network server for viewing at a computer workstation which does not require proprietary workstation software.

It is another object to provide such a method which makes efficient use of the network and results in greater speed of image display in response to requests from the workstations.

It is another object to provide such a method which makes use of caching mechanisms resulting in a balanced load on the network file server and a faster response time to a single client when many clients are accessing the server simultaneously.

It is another object to minimize the computing resources required by a client workstation.

A further object is to provide apparatus for storing graphical images, requesting portions of the stored graphical images from storage, and quickly and efficiently displaying the images on a workstation.

A still further object is to provide a computer program which facilitates requesting portions of graphical images stored on a network server and displaying those portions on a workstation.

SUMMARY OF THE INVENTION

These objects, and others which will become apparent from the following disclosure, are achieved by this invention which comprises in one aspect method of identifying and delivering a graphical image from a computer network file server comprising providing a network file server on which are stored digital document image files, said server adapted to receive requests from a Web browser in Uniform Resource Locator (URL) code, to identify the image file and format selections being requested, to compose the requested view into a grid of view tiles, and to transmit HTML code for view tiles to the requesting Web browser.

Another aspect of the invention comprises apparatus comprising a computer network server adapted to store digital document image files, programmed to recieve requests from a client Web browser in URL code, the URL specifying a view which identifies an image file and format, to compose the requested view, and to transmit HTML code for the resultant view to the client Web browser to display.

A further aspect of the invention is the computer program recorded on magnetic or optical media for use on a network server comprising code which interprets HTTP requests from a workstation for a particular view of a digital document image file stored in memory, retrieves the digital document image file, composes a grid of view tiles corresponding to the requested view of the image, computes HTML code for the grid of view tiles in a form which can be transmitted from the server to the workstation.

The accompanying drawings, which are incorporated in and constitute a part of the specification, illustrate an embodiment of the invention and together with the general description, serve to explain the principles of the invention.

BRIEF DESCRIPTION OF THE DRAWINGS

FIGS. 3A and 3B are diagrams that show the view tile grid as determined by the view scale.

FIGS. 4A and 4B are diagrams that show the grid view tiles composed for an initial image views and then for a shifted view of the image.

FIGS. 5A and 5B are diagrams that show the web browser display of view tiles for an initial view and then for a shifted view of the image that correspond to FIGS. 4A and 4B.

FIGS. 6A and 6B are diagrams that show view tiles pre-computed by the background view composer.

DETAILED DESCRIPTION OF THE INVENTION AND THE PREFERRED EMBODIMENTS

References will now be made in detail to the presently preferred embodiment of the invention, an example of which is illustrated in the accompanying drawings. The preferred embodiment is a server PC consisting of an Intel Pentium Pro 200 MHz processor, with at least 128 MB of RAM, an Ultra-wide Fast SCSI disk controller with at least 4 GB of hard disk space, and LAN/WAN/Internet network interface controllers. The server runs the Windows NT Server Version 4 operating system with NT File System, Microsoft Internet Information Server Version 3, and the network image server software. The server and client are configured with TCP/IP network protocols to support the HTTP (Web) protocol. No software other than a Web browser is required on the client. The preferred Web browser is Internet Explorer 3.0 or Netscape 3.0 or higher.

Figure 1:
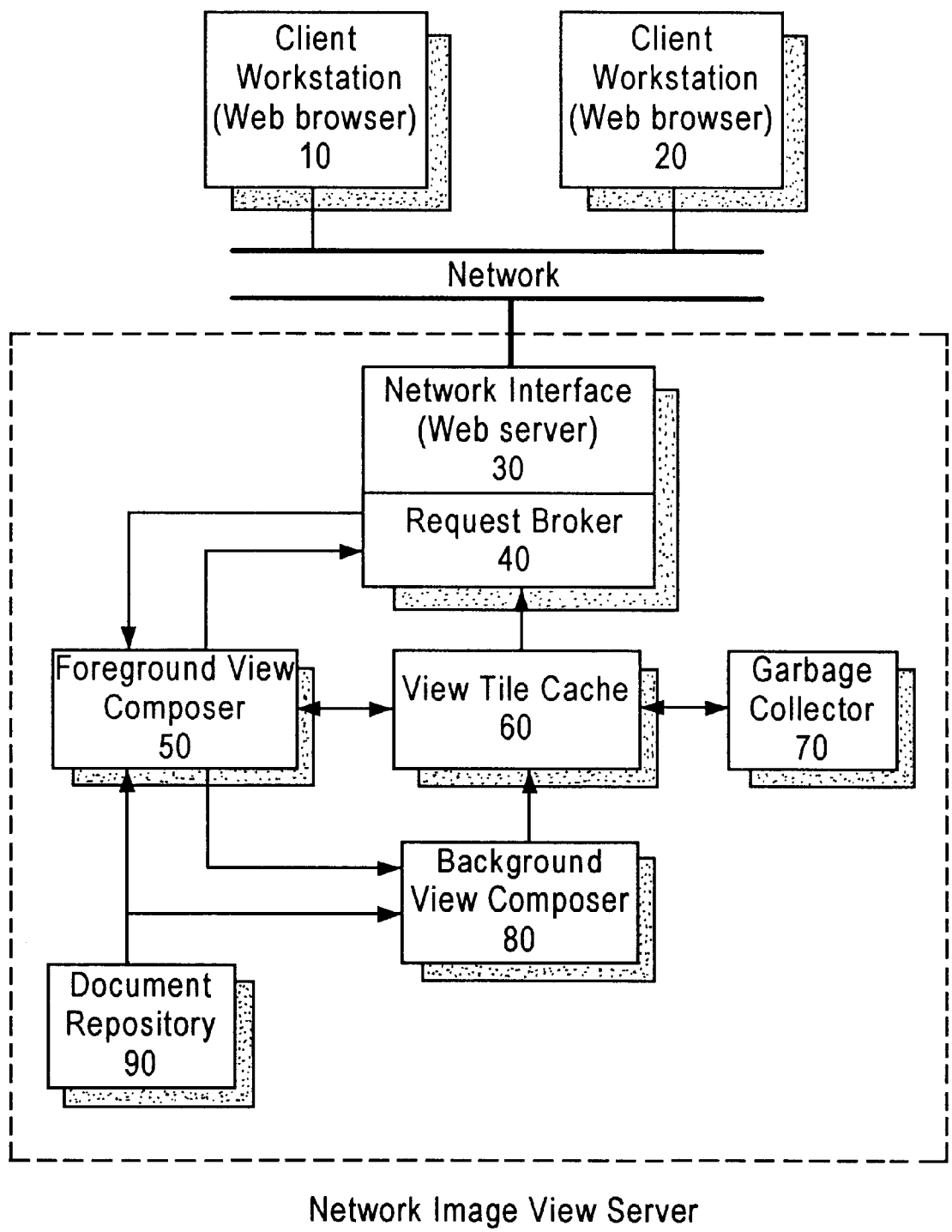
FIG. 1 is a diagram of the system architecture showing the relationship of the components of the system and the image view server.

Referring first to FIG. 1, a network comprising client workstations 10 and 20 are connected through network connections to a network image view server 100 comprising a network server interface, preferably a web server 30 which uses the Hypertext Transfer Protocol (HTTP), a request broker 40, a foreground view composer 50, a view tile cache 60, a background view composer 80, a garbage collector 70, and a document repository 90 having image files.

The network image view server, i.e., client workstation, or "workstation," 100 can be implemented on a computer, for example a personal computer configured with a processor, I/O, memory, disk storage, and a network interface. The network image view server 100 is configured with a network server operating system and Web server software 30 to provide the network HTTP protocol link with the client workstations 10 and 20. Typical networks include many workstations served by one, and sometimes more than one, network server, the server functioning as a library to maintain files which can be accessed by the workstations.

Figure 2:
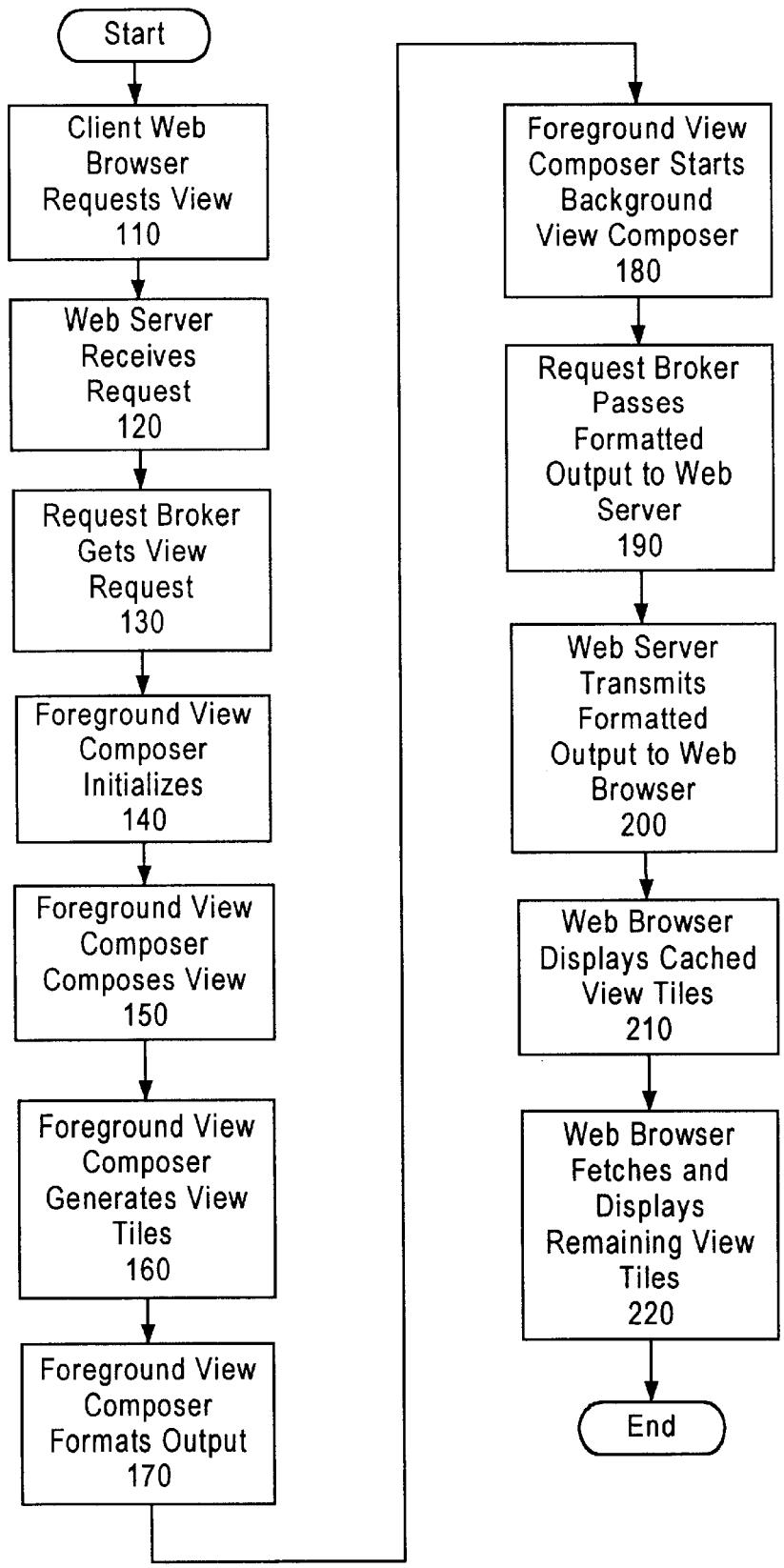
FIG. 2 is a flow diagram of the steps performed by the system to request, compose and display a view of an image.

In operation according to an embodiment of the method of the invention, using the Web browser software on the client workstation, a user requests an image view 110 (FIG. 2) having a scale and region specified by by means of a specially formatted Uniformed Resource Locator (URL) code using HTTP language which the Web server can decode as a request to be passed to the image view composition software and that identifies the image file to be viewed, the scale of the view and the region of the image to view. The network image server sends HTML data to the client with pre-computed hyperlinks, such that following a hyperlink by clicking on an area of an image will send a specific request to the server to deliver a different area of the drawing or to change the resolution of the image. The resultant HTML from this request will also contain pre-computed hyperlinks for other options the user may exercise.

The code is sent over the network to the network server where the web server software interprets the request 120, passes the view request URL to the foreground view composer software through a common gateway interface (CGI) that is designed to allow processing of HTTP requests external to the Web server software, and thereby instructs the request broker 130 to get the particular requested view, having the scale and region called for by the URL. The foreground view composer is initialized 140 and composes the requested view 150 after recovering it from memory on the network server. The foreground view composer software interprets the view request, computes which view tiles are needed for the view, creates the view tiles 160 needed for the view, and then creates Hypertext Markup Language (HTML) output file to describe the view composition to the Web browser, unless the necessary view tiles to fulfill the request are already computed and stored in cache memory of the workstation, in which case the already-computed tiles are recovered by the Web browser. In either case, the foreground view composer formats the output 170 and then intitializes backgound view composer 180 which passes the formatted output to the Web server, which in turn transmits the formatted output over the network to the Web browser 200 on the requesting workstation 10, where the requesting browser displays any view tiles already cached 210, combined with newly computed view tiles 220 which are fetched from the server.

The generation of the view tiles 160 is handled by an image tiling routine which divides a given page, rendered as an image, into a grid of smaller images (FIG. 3A) called view tiles A1, A2, B1, etc. (or just tiles in the image view server context). These tiles are computed for distinct resolutions (FIG. 3B) of a given image at the server according to the URL request received from the browser software on the workstation. The use of tiling enables effective image data caching 60 at the image view server and by the browser 10 at the client workstation.

The preferred view tile format is 128 pixel by 128 pixel GIF image files. The GIF image file format is preferred because of Web browser compatibility and image file size. The GIF image file format is the most widely supported format for graphical Web browsers and therefore gives the maximum client compatibility for the image view server. The GIF image format has the desirable properties of loss-less image data compression, reasonable data compression ratios, color and grayscale support, and a relatively small image file header, which relates to the selection of view tile size. With a raw image data size for monochrome view tiles of 2,048 bytes and a typical GIF compression of 4 to 1, the compressed data for a view tile is approximately 512 bytes. With many image file formats, such as TIFF and JPEG, the image file header (and other overhead information such as data indexes) can be as large or larger than the image data itself for small images such as the view tiles; whereas a GIF header for a monochrome image adds as little as 31 bytes to the GIF image file. Alternate view tile formats such as Portable Network Graphics (PNG) may be used, especially as native browser support for the format becomes common.

The 128 pixel view tile size is a good compromise between view tile granularity and view tile overhead. The view tile granularity of 128 pixels determines the minimum view shift distance (pan distance) that can be achieved with standard graphical Web browser and level 2 HTML formatting. This allows the adjustment of the view position on a 0.64 inch grid when viewing a 200 pixel-per-inch image at 1 to 1 scale. Reducing the size of the view tiles allows finer grid for view positioning, but has the problem that the view tile overhead becomes excessive.

A view tile typically represents more or less than 128×128 pixels of the image file. If the view being displayed is reduced 2 to 1, then each view tile will represent a 256×256 pixel area of the image file that has been scaled down to 128×128 pixels. For each possible scale factor there is an array of tiles to represent the view. Fixed size view tiling is beneficial because it allows more effective use of the caching mechanism at the server and at the client. For example, consider a view of 512 pixels by 512 pixels. Without tiling, this view is composed of a single GIF file that is displayed by the Web browser, and so if the user asks for the view to be shifted by 256 pixels, then a new GIF image of 512×512 pixels needs to be created and transmitted to the Web browser. With tiling, the first view would cause 16 view tiles to be computed and transmitted for display by the Web browser. When the request for the view to be shifted by 256 pixels is made, only 8 view tiles representing an area of 256 by 512 pixels need to be computed. In addition only the 8 new view tiles need to be transmitted to the Web browser since the shifted view will reuse 8 view tiles that are available from the Web browser cache. The use of tiling cuts the computation and data transmission in half for this example.

The use of view tiling also allows the image view server to effectively pre-compute view tiles that may be required by the next view request. The image view server background view composer computes view tiles that surround the most recent view request in anticipation a request for a shifted view. When the shifted view is requested, the foreground view composer can use the pre-computed view tiles and eliminate the time to compute new view tiles for the view. For frequently accessed images there is a good chance that the view tiles for a view may already exist in the view tile cache since the view tile cache maintains the most recently accessed view tiles. Since millions of view tiles may be created and eventually exceed the storage capacity of the image view server, the view tile cache garbage collector removes the least recently accessed view tiles in the case where the maximum storage allocation or minimum storage free space limits are reached.

The number of view tiles needed to render a given view size increases in inverse proportion to the square of the view tile size. A 64 pixel view tile would require 4 times as many view tiles to render the same view area, and so is less preferred. The view tile overhead exists as quantity of data and as the number of network transactions. The data quantity overhead comes from the image file header size as a proportion of the total image file size as described above and as data needed to make the view tile references in the HTML text file. The network transaction overhead increases with smaller view tiles since each of the view tiles requires a network transaction. The increased number of network transactions required with a smaller view tile size would slow the response to render a view.

The HTML output file produced by the foreground view composer is passed to the Web server software to be transmitted to the Web browser. The graphical Web browser serves as the image viewer by utilizing the HTML output from the image view server to compose and display the array of view tiles that form a view of an image. The HTML page data list the size, position and the hyperlink for each view tile to be displayed. The view tiles are stored in the GIF image file format that can be displayed by all common graphical Web browsers. The Web browser will retrieve each view tile to be displayed from a local cache if the view tile is present, otherwise from the image view server.

The request broker 40 takes the raw request from the network server interface 130, interprets the request, communicates with the other system components and determines what the appropriate response should be. It also determines when the response is returned. In the preferred embodiment the request broker is implemented with the Web server Common Gateway Interface (CGI). Options exist to use other direct Application Program Interfaces (API) to the Web server.

To support the tiling and caching of many images on the same image view server, each view tile must be uniquely identified for reference by the Web browser with a view tile URL. This uniqueness is accomplished through a combination of storage location and view tile naming. Uniqueness between images is accomplished by having a separate storage subdirectory in the view tile cache for each image. Uniqueness of view tiles for each scale of view is accomplished through the file name for each view tile. The view tile name is preferably of the following form:

V<SCALE><TILE_NUMBER>.GIF

The<SCALE> value is a 2 character string formed from the base 36 encoding of the view scale number as expressed in parts per 256. The<TILE_NUMBER>value is a 5 character string formed from the base 36 encoding of the tile number as determined by the formula:

TILE_NUMBER=TILE_ROW * IMAGE_TILE_WIDTH+TILE_COLUMN

The TILE_ROW and TILE_COLUMN values start at 0 for this computation. For example the second tile of the first row for a view scaled 2:1 would be named under the preferred protocol:

V3J0001.GIF

The full URL reference for the second tile of the first row for image number 22 on the image view server would be:

http://hostname/view-tile-cache-path/000022/V3J00001.GIF

In addition to the view tile position and view scale, other view attributes that may be encoded in the view tile storage location or in the view tile name. These attributes are view rotation angle, view x-mirror, view y-mirror, invert view. A view tile name with these extra view attributes can be encoded as:

V<SCALE><TILE_NUMBER><VIEW_ANGLE><X_MIRROR><Y_MIRROR><INVERT>.GIF

VIEW_ANGLE is of the form A<ANGLE>. X_MIRROR, Y_MIRROR, and INVERT are encoded by the single characters X, Y, and I respectively. An example is:

V3J00001A90XYI.GIF

The Web server 30 is configured to recognize the above-described specially formatted request Uniform Resource Locators (URL) to be handled by the image view server request broker 40. This is done by association of the request broker 40 with the URL path or with the document filename extension.

The foreground view composer 50 interprets the view request command 140 to determine what view needs to be composed. The view request may be absolute by defining scale and position, relative by defining scale and position as a delta to a previous view, or implied by relying on system defaults to select the view.

Figure 7:
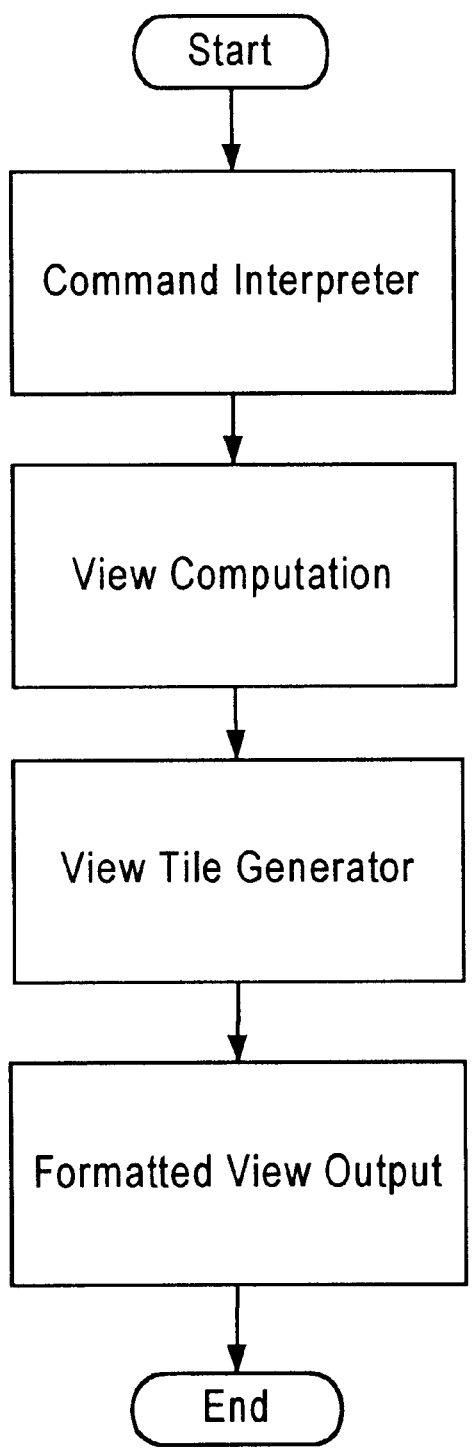
FIG. 7 is a high-level flow diagram of the foreground view composer.

View computation software routine 150 is illustrated in FIG. 7 wherein the command interpreter 151 takes the view request and determines 152 what scale view tile grid is needed for the view and what view tiles within the grid are needed for the view 150 (FIG. 2), and generates the view tile 153, resulting in formatted view output 154.

Figure 8:
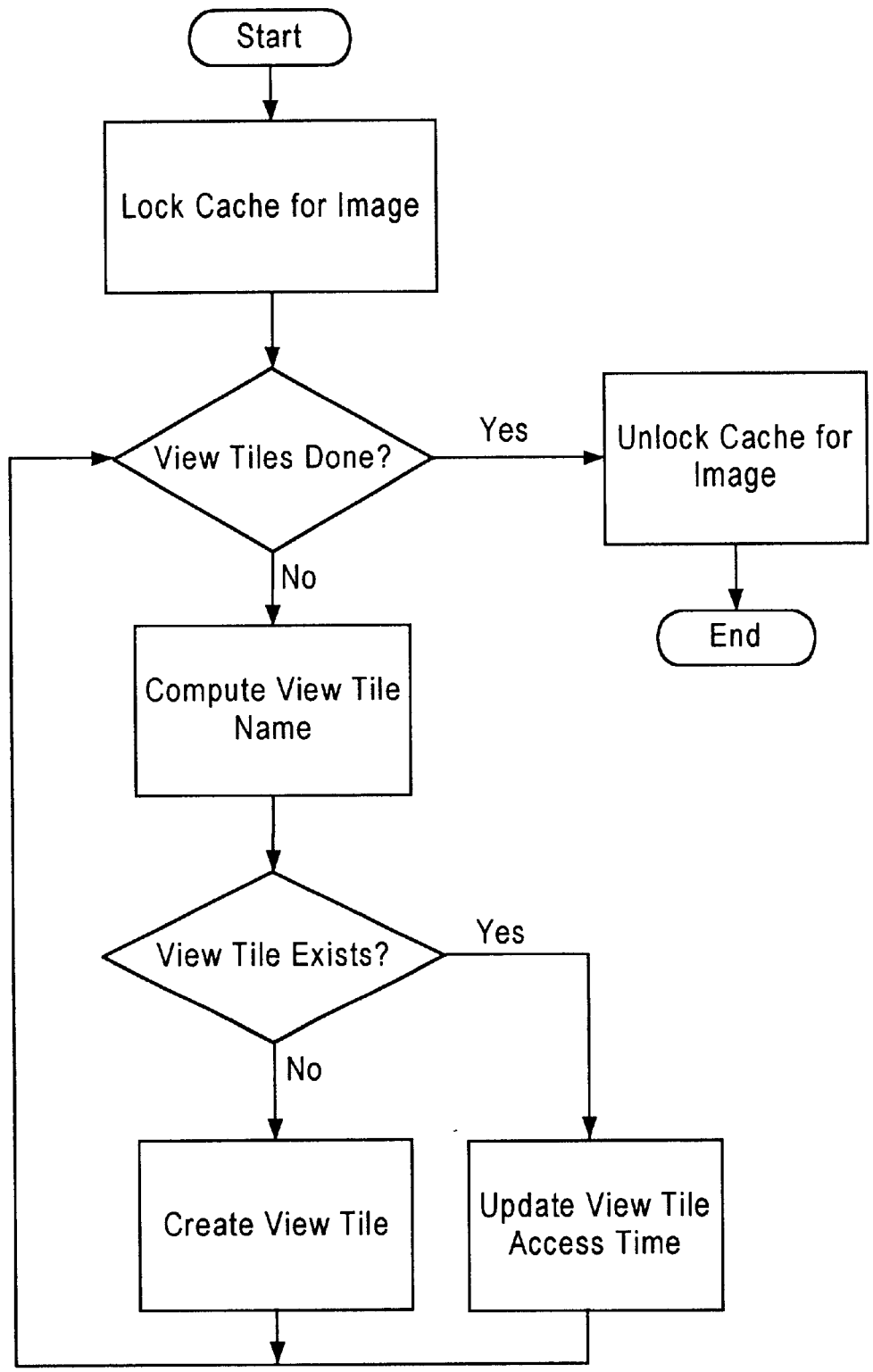
FIG. 8 is a flow diagram for the view generator component of the view composer.
Figure 9:
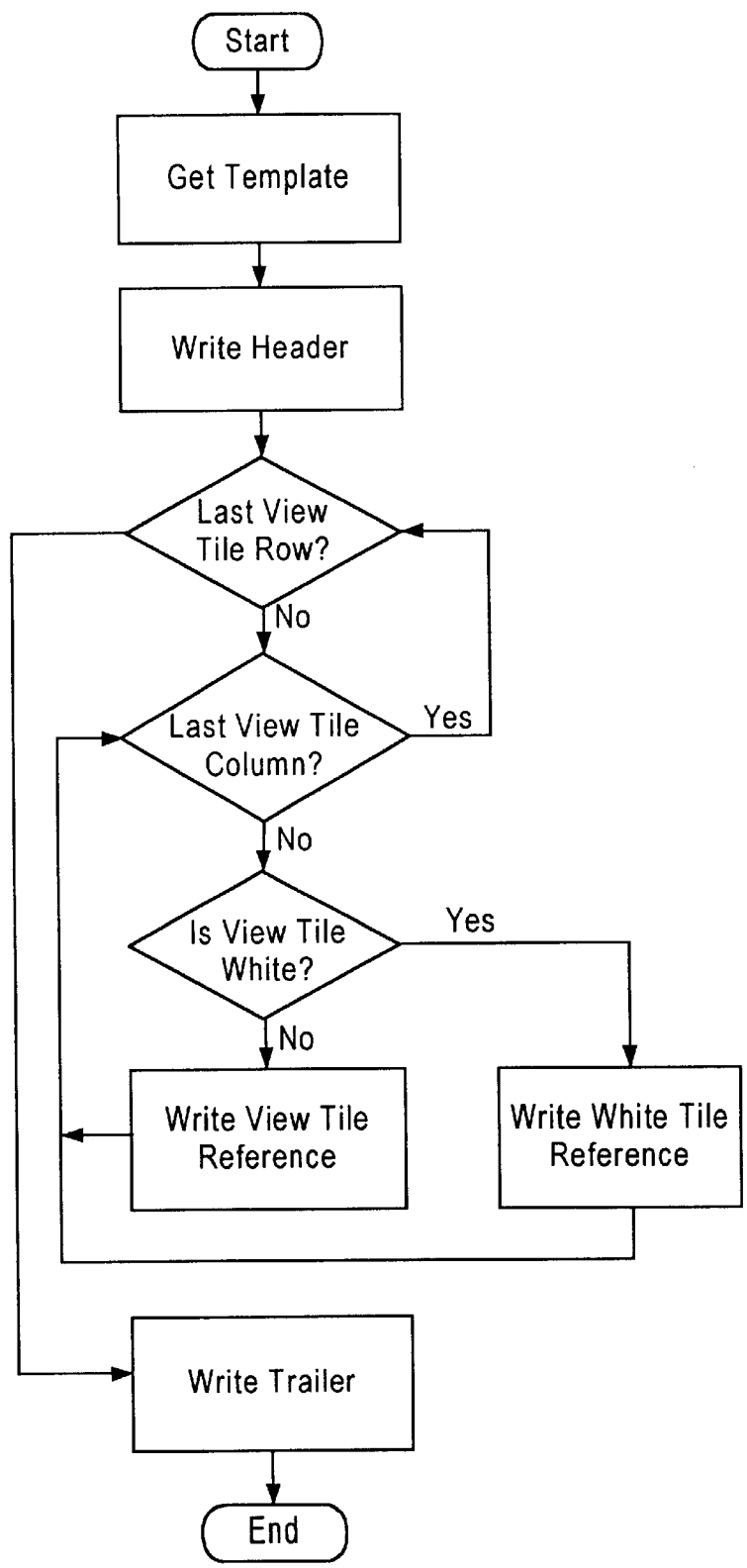
FIG. 9 is a flow diagram for the data output component of the view composer.

The view tile generator routine 160 performs the actual creation of the view tiles according to the preferred steps shown in FIG. 8. The view tile generator receives information from the view computation as to what view tiles are needed for the view. It has access to records in the cache 80 that determine which tiles have already been created and are resident in the cache. If a needed view tile is in the cache then its last access time is updated to prevent the cache garbage collector from deleting the view tile. If a needed view tile is not in the cache, then the view tile generator creates the view tile from the image file 90. The view tile generator uses a software imaging library that supports rendering many digital document file formats including monochrome raster images, grayscale raster images, color raster images as well as many content rich non-raster formats such as Adobe Portable Document Format (PDF), PostScript, HPGL, etc. When rendering monochrome image data the imaging library scale-to-gray scaling is used to provide a more visually appealing rendition of the reduced image.

For example, a specific view request might include tiles B2, C2, B3, and C3 (FIG. 4A and FIG. 5A). If, after viewing those tiles, the client decides that the view to the immediate left is desired, then the server would send tiles A2 and A3 (FIG. 4B and FIG. 5B). This assumes that the client retains in a cache the other tiles. If the client does not cache then tiles A2, A3, B2, and B3 are sent.

Formatted output is created 170 to reference the view tiles needed to display the completed view. The formatted output uses HTML to describe the order, position and hyperlink for each view tile to be displayed. The output formatter applies another optimization by detecting white view tiles and replacing the hyperlink for the image specific white tile with a common white tile reference. This eliminates transmission of all but one white tile and eliminates the need to transmit any white tiles once the common white tile is cached by the Web browser.

The foreground view composer 50 controls the background view composer 80 by stopping it when a foreground view is being composed and then starting it with information about the newest view, once the new view has been composed 180.

Preferably, the background view composer 80 is programmed to optimize performance of the system by pre-computing, i.e., composing, view tiles that may be needed between view requests to the server. The tiles to be pre-computed are the tiles surrounding the most recent view and with the same scale as the most recent view. The order of view tile pre-computation is a clock-wise spiral out from the most recent view. The number of view tiles pre-computed around a view are preferably limited by a system configuration parameter to prevent useless creation of view tiles that may never be needed. Once the maximum number of pre-computed view tiles is reached for the most recent view scale, the pre-computation can proceed for alternate view scales. The background view composer preferably is programmed to work at a low priority to minimize interference with more critical system tasks.

FIG. 6A illustrates how the background view composer algorithm works. Assuming that for a given view requested by the client, tiles C3, C4, D3 and D4 are delivered, after those tile are delivered to the Web browser, the background view composer routine within the server program creates the tiles around these tiles, starting at E4, by composing or computing such surrounding tiles. As long as the client continues to view this page at this scale factor, the server will compute view tiles expanding outward from the tiles requested last. FIG. 6B illustrates another request made by a client, after the two rotations of tiles were generated. The request asked for tiles G3, G4, H3, and H4. When the tile pre-computation begins for this request it will create tiles G5, H5, I5, I4, I3, I2, H2, and G2 in the first rotation, but it will not attempt to create tiles in the F column.

Figure 10A:
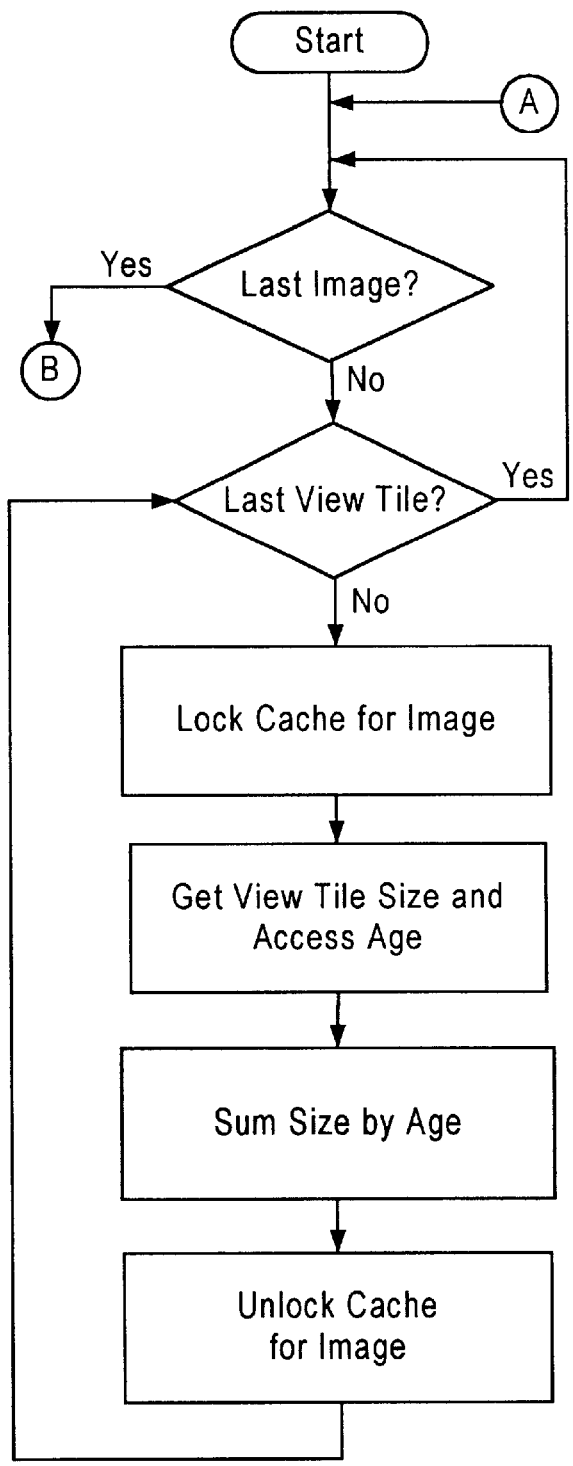
FIGS. 10A, 10B, and 10C together constitute a flow diagram for the view tile cache garbage collector.
Figure 10B:
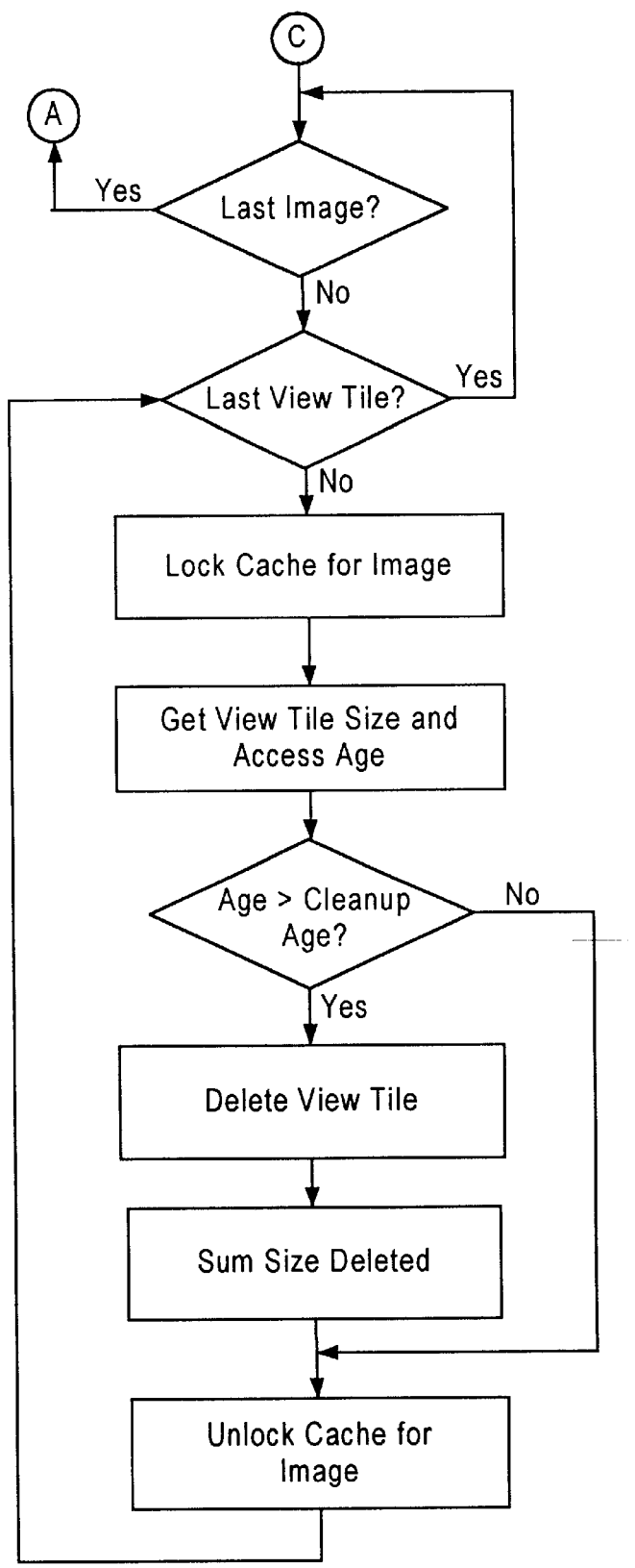
Figure 10C:
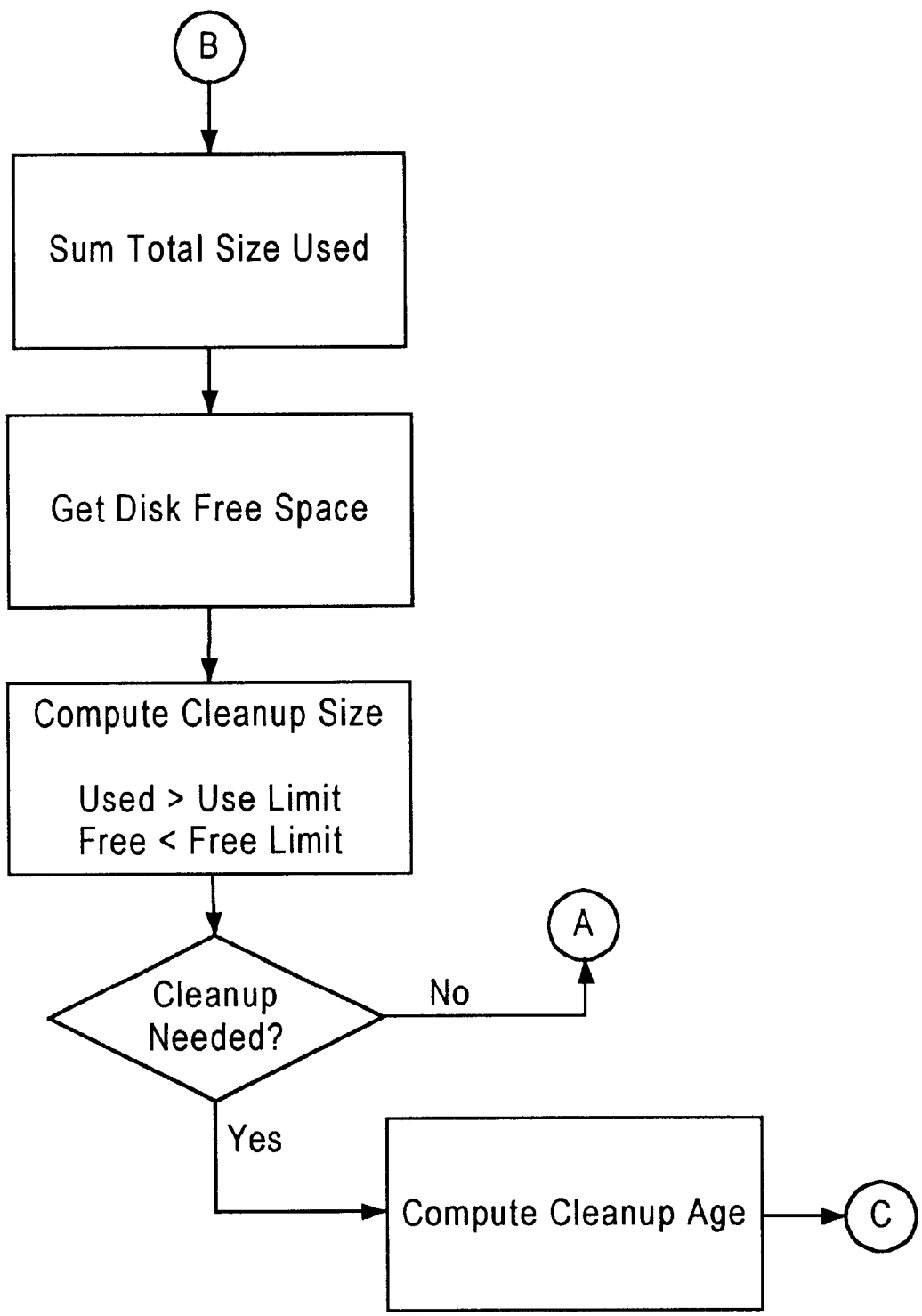

Preferably a view tile cache garbage collector algorithm 70 manages the use of the storage for view tiles (FIGS. 10A, 10B, 10C). The garbage collector maintains the view tile cache 60 (FIG. 1) to keep the view tile cache storage usage below a storage limit and to keep the storage free space above a free space limit. The garbage collector constantly scans the cache to accumulate size and age statistics for the view tiles. When the cache size needs to be reduced, the garbage collector selects the least recently accessed view tiles for deletion until the cache size is within limits. The garbage collector runs at a low priority to minimize interference with more critical system tasks. The storage free space limit is designed as a fail-safe limit to prevent the system from running out of storage. The free space limit is checked on a periodic basis and if it is exceeded the garbage collector becomes a critical system task and runs at a high priority until the storage free space is greater than the free space limit.

Digital document files may be stored on the web server or on another server within the network. The image files are typically managed as digital documents with attribute information that is stored with the documents in the document repository 90. A digital document management system can run independently or in conjunction with the image view server software. The digital document file may-be a raster image file or a non-raster document file. If the digital document file is a non-raster format then it is rendered as a monochrome, grayscale, or color raster image for viewing.

The graphical Web browser on the client workstation 10 receives HTML data from the image view server 210 that contains hyperlinks to the view tiles within the view tile cache 60 to be displayed and formatting that describes the layout of the of the tiles to form the image view. The Web browser initially must fetch each view tile 220 for a view from the view server. After the initial view, whenever a view overlaps with a previous view at the same scale, the Web browser preferably retrieves view tiles that have been previously displayed from the Web browser's local cache 210 rather than from the server.

Performance and usability of document viewing can be increased by using progressive display of tiled images. By using an image file format that allows a rough view of the image to be displayed while the remainder of the image content is downloaded, a rough view of the document can be seen more quickly.

Since most Web browsers can only transfer 1 to 4 GIF images at a time, usually not all of the view tiles in the view array can be progressively displayed at the same time. Therefore, it is preferred that to implement progressive display, algorithms at the client are provided to accept an alternate data format that would allow the whole document viewing area screen to take advantage of the progressive display while still taking advantage of the benefits of tiling and caching at the client. This can be accomplished in a Web browser environment using algorithms written in Java, JavaScript, or ActiveX technologies. By using client software to enhance the client viewer, additional enhancements to performance can be made by using alternate view tile image formats and image compression algorithms. A significant example would be to use the Portable Network Graphics (PNG) format with the optimization of having the image view server and client transfer only one image header common to be shared by all view tiles and then sending the low-resolution compressed image data for each view tile followed by the full-resolution image data for each view tile.

In addition to displaying the view tile array for the requested view, the HTML data can include hyperlinks used to form a tool bar that provide the user with a way to send requests to the server to change the current view by increasing or decreasing the view scale, shifting the view area, or changing the view size. Such hyperlinks would reference the current view and also contain operation codes that direct the image view server to compose a new view based on the hyperlink selected by the user.

The method, apparatus, and software article of the invention provide an improved client-server architecture using a graphical Web browser to access the image view server which makes efficient use of the network. By using image tiling and caching according to the preferred method, relatively small amounts of data need to be transmitted when the user selects a new view of an image already received and viewed. The server sends the requested image in the request format to the workstation and then allows viewing the image from the local copy of the image file. The image view server provides a better solution by utilizing lower cost graphical Web browsers for the workstations to access a network image view server that provides views of the image that can be displayed on the workstation by the graphical Web browser. For example an E-size engineering drawing raster image file is 8 million bytes in size when imaged in monochrome at 200 pixels-per-inch. With commonly used data compression the image file can be reduced to 250 kilobytes. With a low bandwidth 28.8 kilobaud modem network connection with approximately 3 kilobytes-per-second throughput, it 83 seconds (250 KB/3 KB/second) to transfer the image file to the workstation application for viewing. With the image view server only the image data to be displayed needs to be transmitted. A typical view size of 896 by 512 pixels is made up of a 7 by 4 array of 128 pixel×128 pixel view tiles. The monochrome view tiles are transmitted in a compressed format that typically yields tiles that are 512 bytes each so the entire view is approximately 14 kilobytes (0.5 KB×28 tiles) and the transfer takes approximately 4.8 seconds (14 KB/3 KB/second). This method of image viewing provides better response to the user with much lower demand on the network connection. A local-area-network typically utilizes a 10 megabit-per-second media so the savings from the efficiency of the image view server does not seem obvious. However, if the 10 megabit-per-second network is shared by 100 users, then the average bandwidth per user is only about 12.5 kilobytes-per-second so the efficiency of the image view server is still a benefit. Another benefit of the image view server is that the data transfer size remains constant even if the size of the view image is increased. If the image file size was 4 times larger than with the previous example as may be the case with a larger image, a higher resolution image or a less compressible image then the network load by the image view server would remain unchanged while network load of the traditional image viewer would quadruple.

The invention lowers the software purchase costs since a graphical Web browser is a common workstation application that is inexpensive and the expense for the Web browsers is often a cost that is required for the workstation for other purposes and in many cases is included with the workstation operating system. The costs for the server software can be shared over hundreds of client workstations.

The software administrative cost is reduced by using the graphical Web browser that is a common workstation application that is already being administered, by eliminating an additional proprietary workstation software application, and by using server software that only needs to be administered on a central server rather than for each workstation.

The graphical Web browser is available on all common workstation types as well other devices such as notebook computers, palm-top computers, Network Computers and Web television adapters to provide a widely available solution.

It will be apparent to those skilled in the art that various modifications and variations can be made in network image view server and image view server methods without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of identifying and delivering a graphical image from a computer network file server, the network file server adapted to store at least one digital document image file and adapted to receive a request for a view from a computer in Uniform Resource Locator (URL) code, the method comprising:

identifying an image file and format selection from a requested view, the format comprising an operation code for selecting an updated view and view template for determining the presentation of the view;

in response to receiving the view request and identifying the image file and format selection, retrieving the digital document image file and composing the requested view into a grid of view tiles corresponding to the requested view of the image; and computing and transmitting HTML code for the grid of view tiles to the requesting computer.

2. The method as claimed in claim 1 wherein the view request identifies the image file, tile number within the image file, format comprising one or more of position, scale, rotation angle, x mirror, y mirror, inversion, region, operation code to select an updated view, and view template to determine the presentation of the view.

3. The method as claimed in claim 2 wherein the transmitted HTML code for the view tiles causes the requesting computer to display the requested view of the requested graphical image in the requested format.

4. The method as claimed in claim 2 wherein an array of view tiles selected from the grid of view tiles to fulfill the view request is computed by the network file server and transmitted over the network to the requesting computer in HTML and an image file format.

5. The method as claimed in claim 4 wherein the network file server creates an HTML output file listing the size, position, and hyperlink for each view tile to be displayed.

6. The method as claimed in claim 4 wherein the view tiles are stored in an image file format for each view tile for display by the requesting computer.

7. The method as claimed in claim 6 wherein the image file format is at least one of GIF, JPEG, PNG, and TIFF format.

8. The method as claimed claim 1 wherein at least one view tile adjacent to the array of view tiles transmitted to the requesting computer is computed by the network file server during a time period subsequent to the transmission of the array of view tiles, and the adjacent view tile is stored on the network file server.

9. The method as claimed in claim 8 wherein in response to a view request for a view tile adjacent to a previously transmitted array of view tiles, the network file server transmits the subsequently computed adjacent view tile.

10. The method as claimed in claim 2 wherein the requesting computer is adapted to cache received view tiles, and in response to generation of a view request including one or more cached view tiles, retrieving one or more cached view tiles.

11. The method as claimed in claim 2 wherein the view tiles are 128 pixel by 128 pixel image files.

12. The method as claimed in claim 2 wherein the view tiles are 256 pixel by 256 pixel image files.

13. The method as claimed in claim 2 wherein the view tiles are 512 pixel by 512 pixel image files.

14. The method as claimed in claim 2 wherein each view tile is identified by the server with a unique URL which includes storage location and view tile naming data.

15. The method as claimed in claim 2 wherein the position is at least one of absolute, relative, and implied.

16. The method as claimed in claim 14 wherein the view tile naming data includes a view scale.

17. The method as claimed in claim 1 wherein the network file server includes a Web server implemented with Web server Common Gateway Interface (CGI).

18. The method as claimed in claim 1 wherein the requesting computer is configured to run applets or scripts to improve communication with the network file server to reduce the amount of transmitted data.

19. The method as claimed in claim 1 wherein the requesting computer and network file server are adapted to minimize the amount of redundant data transmitted to the requesting computer from the network file server.

20. The method as claimed in claim 1 wherein higher resolution images are sampled by the network file server to transmit lower resolution images to the requesting computer.

21. The method as claimed in claim 1 wherein monochrome gray scale, or color image files are stored on the network file server and transmitted to the requesting computer.

22. The method as claimed in claim 1 wherein non-raster image files are rasterized by the network file server.

23. The method as claimed in claim 1 wherein image files are stored on a second server and retrieved and temporarily stored by the network file server when needed.

24. The method as claimed in claim 1 wherein the requesting computer includes at least one of a workstation, a notebook computer, a palm-top computer, a network computer, and a web television adapter.

25. The method as claimed in claim 1 wherein the image file includes at least one of a raster image format and a non-raster image format.

26. The method as claimed in claim 25 wherein the raster image format includes at least one of a monochrome raster image, a grayscale raster image, and a color raster image.

27. The method as claimed in claim 25 wherein the non-raster image format includes at least one of an Adobe Portable Document Format (PDF), an Adobe PostScript (PS) format, and a Hewlett-Packard Graphics Library (HPGL) format.

28. A method of identifying and delivering a graphical image from a computer network file server, the network file server storing digital document image files, the method comprising:

receiving requests from a Web browser in Uniform Resource Locator (URL) code;

identifying the image file and format selections being requested;

composing the requested view into an array of view tiles; and transmitting HTML code for view tiles to the requesting Web browser;

wherein view tiles adjacent to the array of view tiles transmitted to the Web browser to fulfill the request described by the URL are computed by the server during a time period subsequent to the transmission of the array of view tiles, and the adjacent view tiles are stored in cache form on the server in anticipation of future requests from the Web browser; and wherein the view tiles adjacent to the array of view tiles transmitted to the Web browser are computed by the server in a clockwise or counterclockwise spiral sequence outward from the array of view tiles transmitted.

29. A method of identifying and delivering a graphical image from a computer network file server comprising providing a network file server on which are stored digital document image files, said server adapted to receive requests from a Web browser in Uniform Resource Locator (URL) code, to identify the image file and format selections being requested, to compose the requested view into a grid of view tiles, and to transmit HTML code for view tiles to the requesting Web browser; wherein the URL view request identifies the image file, tile number within the image file, formats comprising one or more of position, scale, rotation angle, x mirror, y mirror, inversion, region, opcode to select an updated view, and view template to determine the presentation of the view, and wherein the transmitted HTML code for the view tiles causes the requesting Web browser to display the requested view of the requested graphical image in the requested format; wherein each view tile is identified by the server with a unique URL which includes storage location and view tile naming data; wherein the URL includes identification data for each scale of view through the file name for each view tile; and wherein view tiles are named in the format V<SCALE><TILE_NUMBER>.<IFF> wherein <SCALE> value is a 2 character string formed from the base 36 encoding of the view scale number as expressed parts per 256.

30. A method of identifying and delivering a graphical image from a computer network file server comprising providing a network file server on which are stored digital document image files, said server adapted to receive requests from a Web browser in Uniform Resource Locator (URL) code, to identify the image file and format selections being requested, to compose the requested view into a grid of view tiles, and to transmit HTML code for view tiles to the requesting Web browser; wherein the URL view request identifies the image file, tile number within the image file, formats comprising one or more of position, scale, rotation angle, x mirror, y mirror, inversion, region, opcode to select an updated view, and view template to determine the presentation of the view, and wherein the transmitted HTML code for the view tiles causes the requesting Web browser to display the requested view of the requested graphical image in the requested format;

wherein each view tile is identified by the server with a unique URL which includes storage location and view tile naming data;

wherein the URL includes identification data for each scale of view in the file name for each view tile;

wherein the tile number is encoded in the file name for each view tile;

wherein the image file format is specified in the file name for each view tile;

and wherein view rotation angle, view x-mirror, view y-mirror and invert view information is encoded in the URL naming format in the form V<SCALE><TILE_NUMBER><VIEW_ANGLE><X_MIRROR><Y_MIRROR><INVERT>.<IFF>wherein VIEW_ANGLE is of the form A<ANGLE>; and X_MIRROR, Y_MIRROR, and INVERT are encoded by the single characters X, Y, and I, respectively.

31. Apparatus comprising:

a computer network server adapted to store digital document image files and programming to receive a view request in Uniform Resource Locator (URL) code, the URL specifying a view which identifies an image file and format selection, the format comprising operation codes for selecting an updated view and view template for determining the presentation of the view;

in response to receiving the view request and identifying the image file and format selection, to retrieve the digital document image file and compose the requested view into a grid of view tiles; and to compute and transmit HTML code for the resultant grid of view tiles.

32. The apparatus as claimed in claim 31 wherein the server is programmed with Web server software and a foreground view composer adapted to interpret the view request, compute a grid of view tiles of the image, compute an array of view tiles needed for the requested view, to compose the array of view tiles needed for the requested view, and to create an HTML output file to describe the view composition.

33. The apparatus as claimed in claim 31 wherein the server is programmed with a background view composer adapted to compute and cache, during periods between view requests, view tiles surrounding the most recent view request in the same scale as the most recent view so that when a new, shifted view is subsequently requested, the server program computes which of the resultant cached surrounding view tiles are used in response to the request for a shifted view, and composes a view including or more of the cached view tiles.

34. An apparatus comprising: a network computer for issuing view requests in URL code and displaying received HTML code in response to the view request issuance, wherein the URL specifies a view identifying an image file and format and the HTML code specifies an array of view tiles.

35. The apparatus as claimed in claim 34 wherein the network computer is programmed to cache view tiles received in response to a view request and to access the cached view tiles when included within an array of view tiles included in a subsequent view request.

36. The apparatus as claimed in claim 35 wherein the network computer is programmed with a view tile cache garbage collector for removing the least recently accessed view tiles when maximum storage allocation or minimum storage free space limits are reached.

37. An apparatus comprising: a computer network server for storing digital document image files, programmed (a) to receive a request from a computer in URL code, the URL specifying a view identifying an image file and format, (b) to compose the requested view, and (c) to transmit HTML code for the composed view to the requesting computer;

and wherein the surrounding view tiles are computed by a background view composer in a clock-wise or counter-clockwise spiral out from the most recent composed view.

* * * * *